United States Patent
Sheik et al.

(10) Patent No.: US 12,556,308 B2
(45) Date of Patent: Feb. 17, 2026

(54) PROTECTION FOR DOWNLINK SIGNALING RADIO BEARER (SRB) SEGMENTATION OF A PROTOCOL DATA UNIT (PDU)

(71) Applicant: QUALCOMM Incorporated, San Diego, CA (US)

(72) Inventors: Ansah Ahmed Sheik, Hyderabad (IN); Chinmaya Padhy, Hyderabad (IN); Sarath Kumar Pujari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 805 days.

(21) Appl. No.: 17/685,110

(22) Filed: Mar. 2, 2022

(65) Prior Publication Data

US 2023/0283407 A1    Sep. 7, 2023

(51) Int. Cl.
*H04L 1/16* (2023.01)
*H04L 5/00* (2006.01)
*H04W 8/18* (2009.01)

(52) U.S. Cl.
CPC ............. *H04L 1/16* (2013.01); *H04L 5/0055* (2013.01); *H04W 8/183* (2013.01)

(58) Field of Classification Search
CPC .................... H04W 74/006; H04W 76/19; H04W 74/0833
See application file for complete search history.

(56) References Cited

U.S. PATENT DOCUMENTS

2016/0065353 A1* 3/2016 Huang .................. H04L 5/1469
                                                                370/294
2023/0025829 A1* 1/2023 Jin ......................... H04L 69/325

OTHER PUBLICATIONS

"Novel Way to Protect DL SRB Segmentation of PDUs", 4 Pages.

* cited by examiner

*Primary Examiner* — Siming Liu
(74) *Attorney, Agent, or Firm* — Patterson+ Sheridan, L.L.P.

(57) ABSTRACT

Certain aspects of the present disclosure provide techniques for wireless communication by a user equipment (UE), comprising receiving, from a network entity, at least one protocol data unit (PDU) segment of a set of PDU segments of a PDU, and in response to the receiving, processing the at least one PDU segment prior to receiving every PDU segment of the PDU.

31 Claims, 11 Drawing Sheets

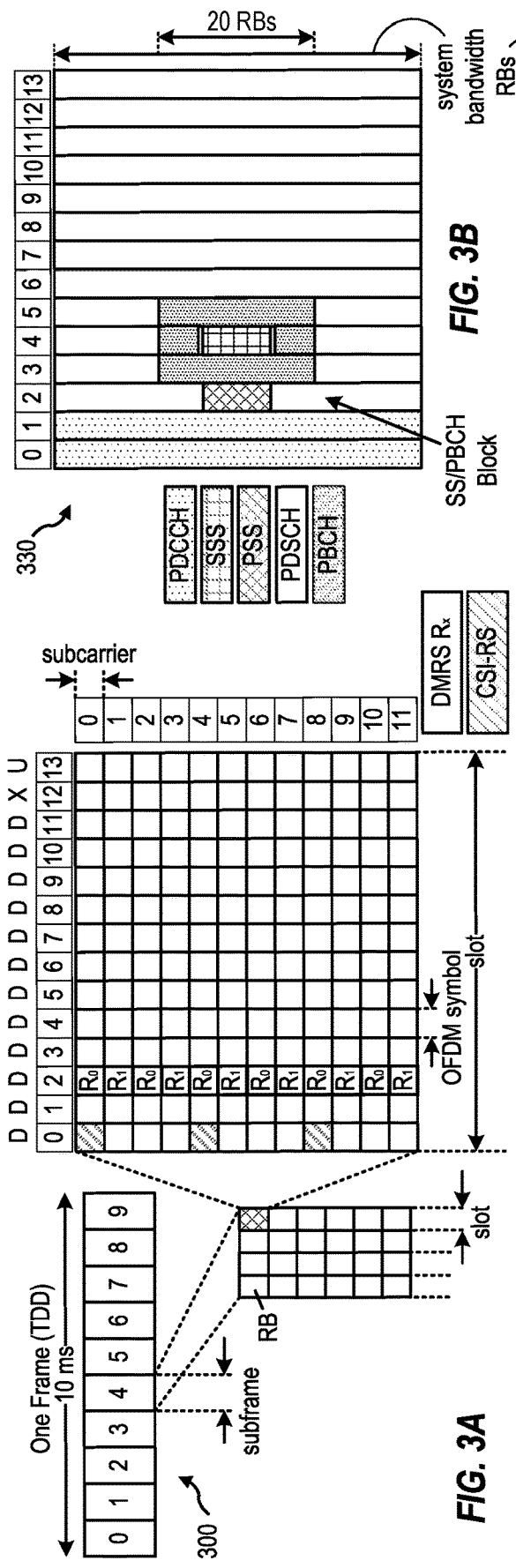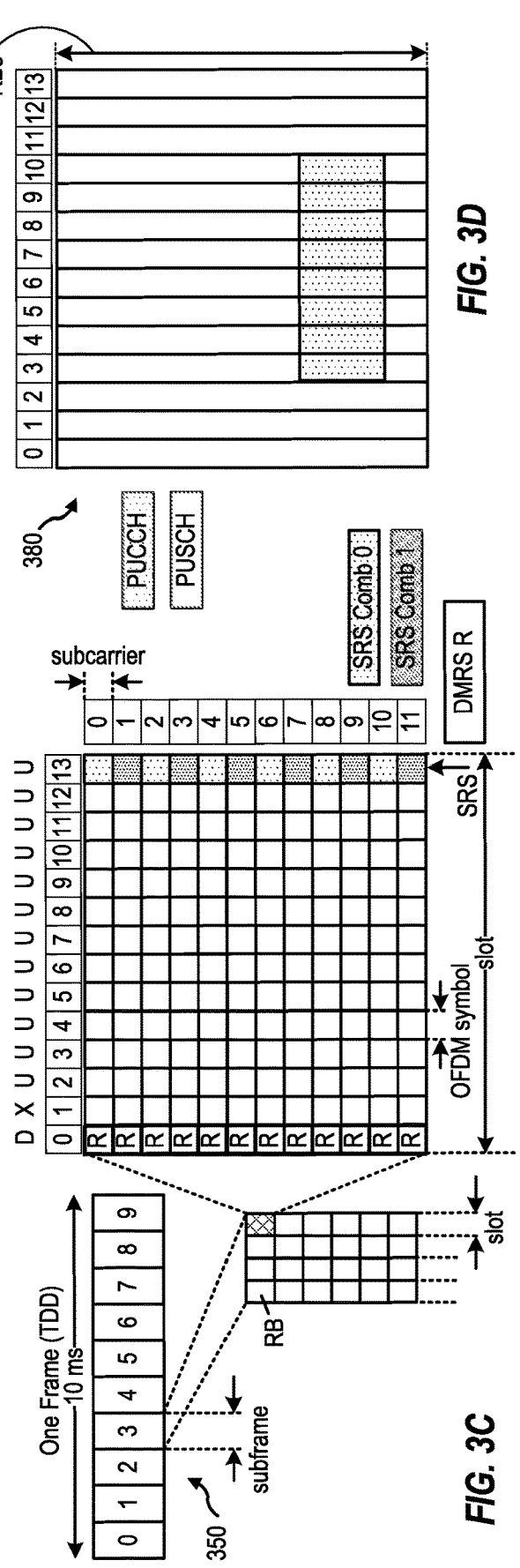

| RRC reconfiguration | *DLDedicatedMessageSegment* | RRCReconfigurationComplete | 16+(Nseg -1)*10 | Nseg is number of RRC segments |

DL NR
RRC Message

PROTECTION FOR DOWNLINK SIGNALING RADIO BEARER (SRB) SEGMENTATION OF A PROTOCOL DATA UNIT (PDU)

INTRODUCTION

Aspects of the present disclosure relate to wireless communications, and more particularly, to techniques for protecting segmented protocol data units (PDUs) received during downlink (DL) transmission.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE), comprising receiving, from a network entity, at least one protocol data unit (PDU) segment of a set of PDU segments of a PDU, and in response to the receiving, processing the at least one PDU segment prior to receiving every PDU segment of the PDU.

One aspect provides a method for wireless communication by a multiple subscriber identity module (SIM) UE, comprising processing a set of protocol data unit (PDU) segments on a first SIM, wherein the first SIM has a first priority, receiving signaling on a second SIM having a second priority greater than the first priority, and continuing to process the set of PDU segments on the first SIM.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 7 is a table illustrating a radio resource control (RRC) element indicating segmentation of protocol data units (PDUs) during downlink (DL) transmission.

DETAILED DESCRIPTION

Aspects of the present disclosure provide apparatuses, methods, processing systems, and computer-readable mediums for protecting segmented protocol data units (PDUs) received during downlink (DL) transmission.

In current wireless systems (e.g., 5G new radio (NR)), steady deployment of new features has increased message sizes between network entities and user equipments (UEs). To accommodate increased message sizes, segmentation features allow networks to parse messages for piecemeal signaling. In one example, a radio resource link (RRC) message may have a protocol data units (PDUs) size exceeding a maximum packet data convergence protocol (PDCP) service data unit (SDU). To manage an oversized PDU, the PDU may be divided into multiple PDU segments and transmitted as a set of PDU segments to a user equipment (UE).

Upon receipt, the UE may not decode each PDU segment individually. Instead, a UE may have to wait until all PDU segments of a complete PDU are received so that the PDU may be decoded in its entirety. Where segments of a transmitted PDU are unordered, lost, or increased, the processing time for the PDU segments may be extended. The UE will not be able to process the individual PDU segments nor implement the actions directed by the segments until all of the segments have been received. Additionally, the UE may spend time waiting for retransmitted PDU segments instead of taking responsive action. As a result, PDU segmentation may create processing time delays that slow down UE efficiency.

According to certain aspects of the present disclosure, a UE may take action to optimize UE processing for segmented PDUs in order to overcome processing delays caused by segmentation. In one case, the UE may implement a prioritized decode of some PDU segments prior to the receipt of every PDU segment. The UE may use information inside the incrementally decoded PDU segments, which may carry useful information (e.g., handover and/or measurement information). By implementing an early decoding procedure using the partial PDU segments, a UE may start preparing early measurement, handover evaluation, and so on. When a UE is in a cell edge condition or if there is dip in reference signal received power (RSRP), the UE may utilize the partially decoded PDUs for quicker service acquisition based on the partial decode.

Introduction to Wireless Communication Networks

Figure 1:
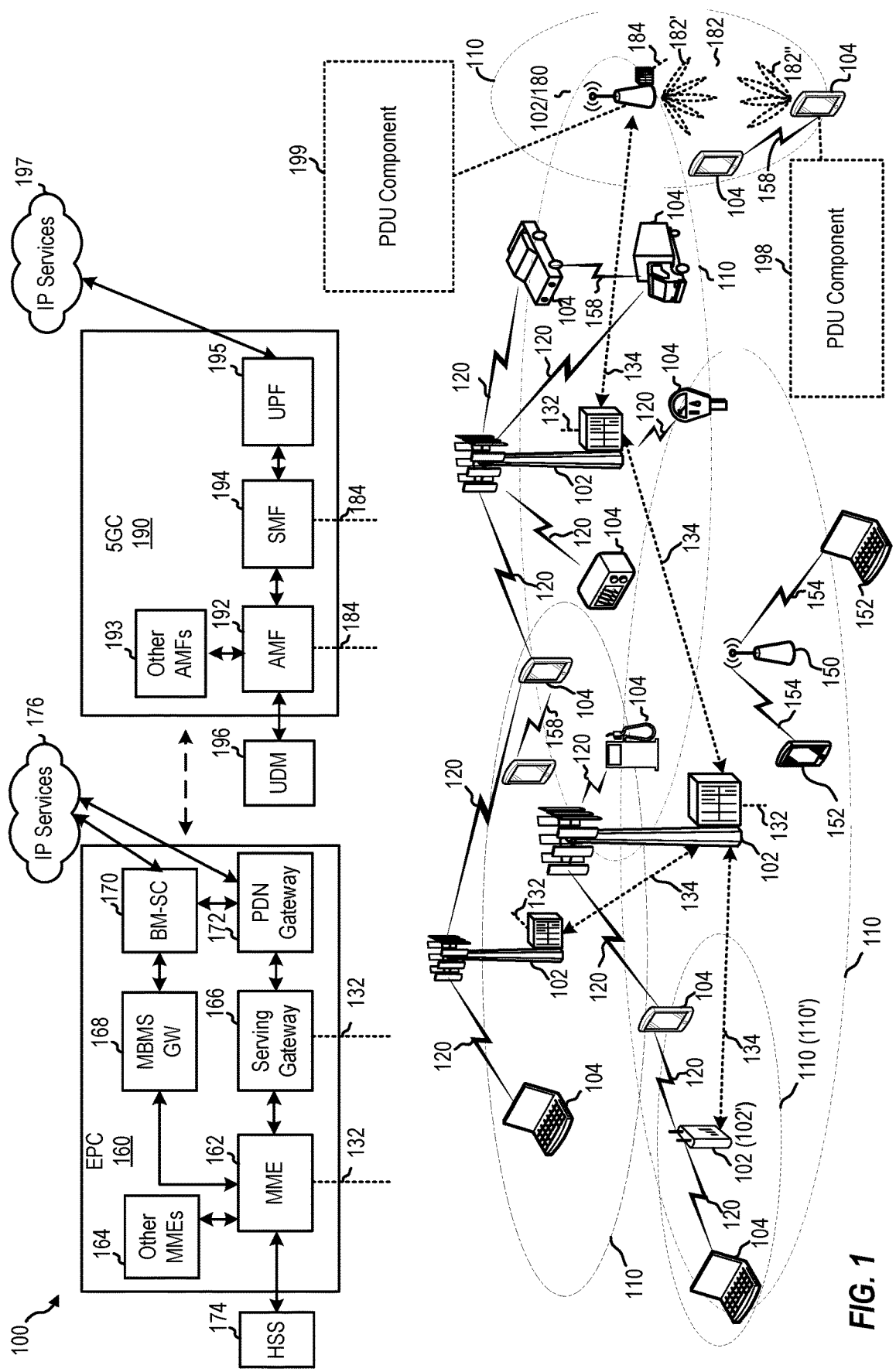
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes protocol data unit (PDU) component 199, which may be configured to transmit segmented PDUs using radion resource control (RRC) signalling. Wireless network 100 further includes PDU component 198, which may be used configured to receive and process segmented PDUs.

Figure 2:
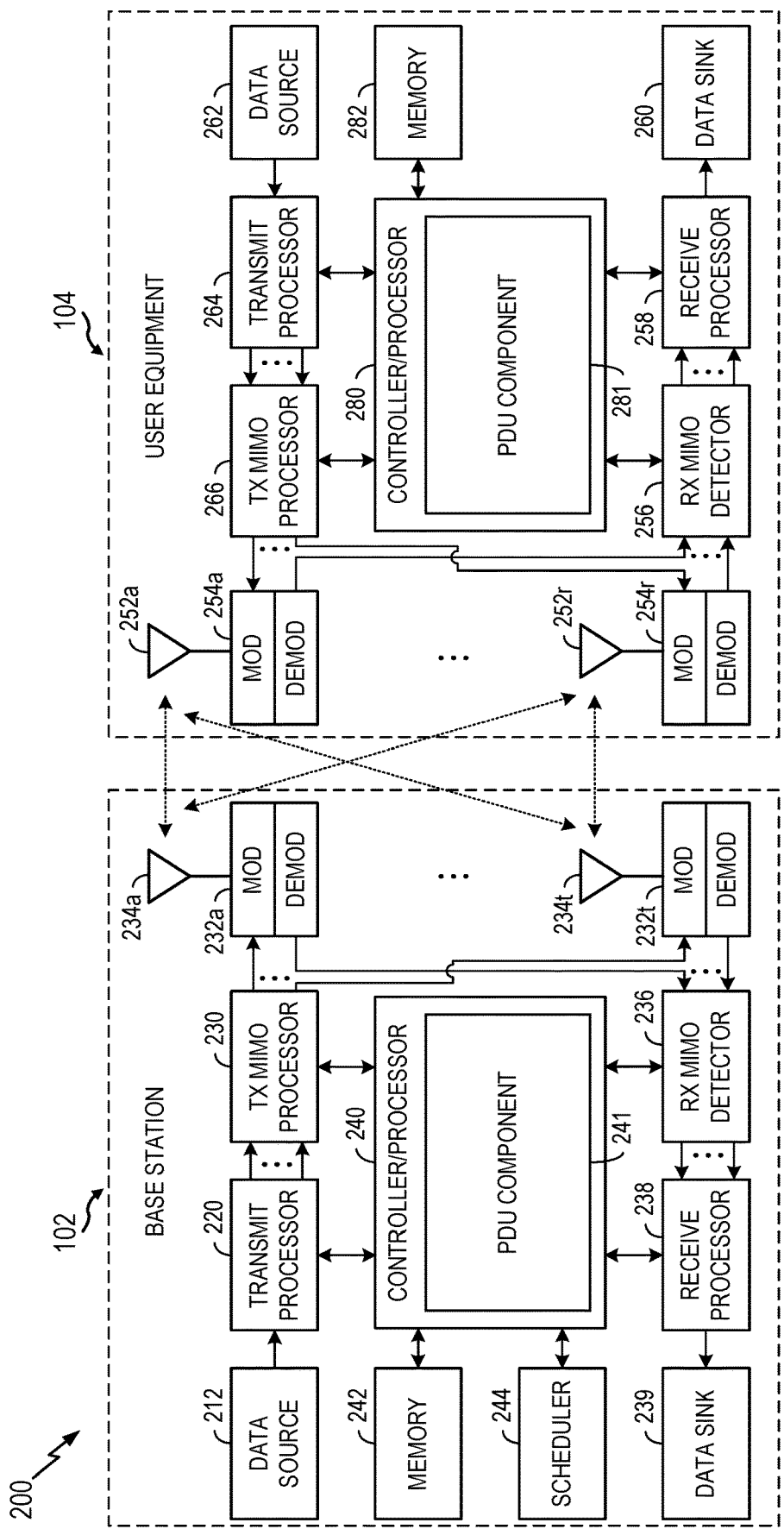
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes PDU component 241, which may be representative of PDU component 199 of FIG. 1. Notably, while depicted as an aspect of controller/processor 240, PDU component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes PDU component 281, which may be representative of PDU component 198 of FIG. 1. Notably, while depicted as an aspect of controller/processor 280, PDU component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Figure 4:
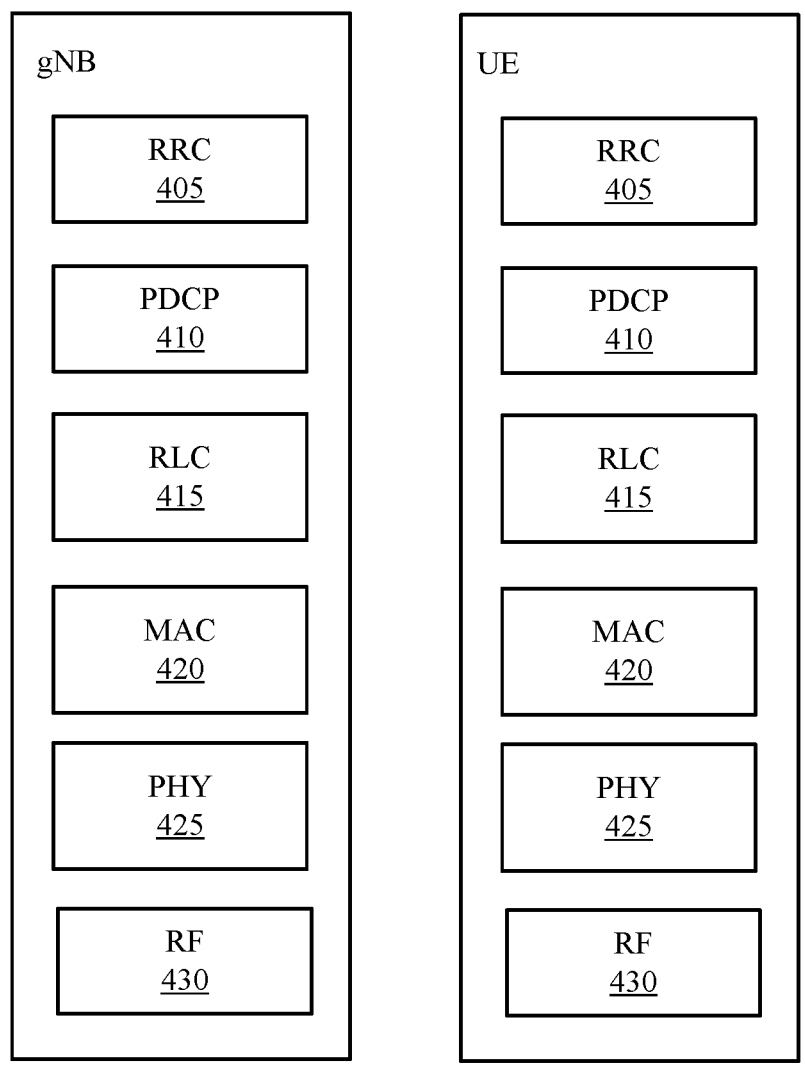
FIG. 4 depicts an example 5G protocol stack for a wireless entity and a user equipment (UE).

FIG. 4 illustrates a diagram showing examples for implementing a communications protocol stack 400 in a RAN. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by the BS and/or the UE.

While not illustrated in FIG. 4, in one example, the protocol stack 400 is split at the AN. The radio resource control (RRC) layer 405, packet data convergence protocol (PDCP) layer 410, radio link control (RLC) layer 415, medium access layer (MAC) layer 420, physical (PHY) layer 425, and radio frequency (RF) layer 430 may be implemented by the UE.

In a wireless communication network, a packet of information may flow through several sub-layers of the communication protocol stack 400 as it travels from one node to another. As shown in FIG. 4, the 5G new radio (NR) protocol stack is illustrated with the higher layers on top. An IP packet received at a lower layer may progress upward through the stack. A packet may enter the receiving protocol stack through the RLC layer 415 and travels up the protocol stack through a PDCP layer 410 and RRC layer 405. Each protocol layer may manipulate the data by adding header or subheader information, converting the data into different formats, reassembling data, and/or combining packets to form larger packets. When the transceiver station transmits the data, the data may work its way down through a protocol stack at the receiving station. The protocol at each layer may reverse the processing that was done by the corresponding layer by the receiving node; headers may be added, data may be multiplexed and divided split into smaller packets, and so on.

Once the data has progressed through the PHY, MAC, RLC, PDCP, and service data adaptation protocol (SDAP) layers, the packet may either be used or again progress downward through the protocol layers and be sent to a second receiving node. For example, where the receiving station is also a relay node, the packet may again progress downward through the protocol layers in a format supported by a link between the relay node and a destination node. Thus, when the packet reaches the PHY layer, it may again be sent to a destination node.

Figure 5:
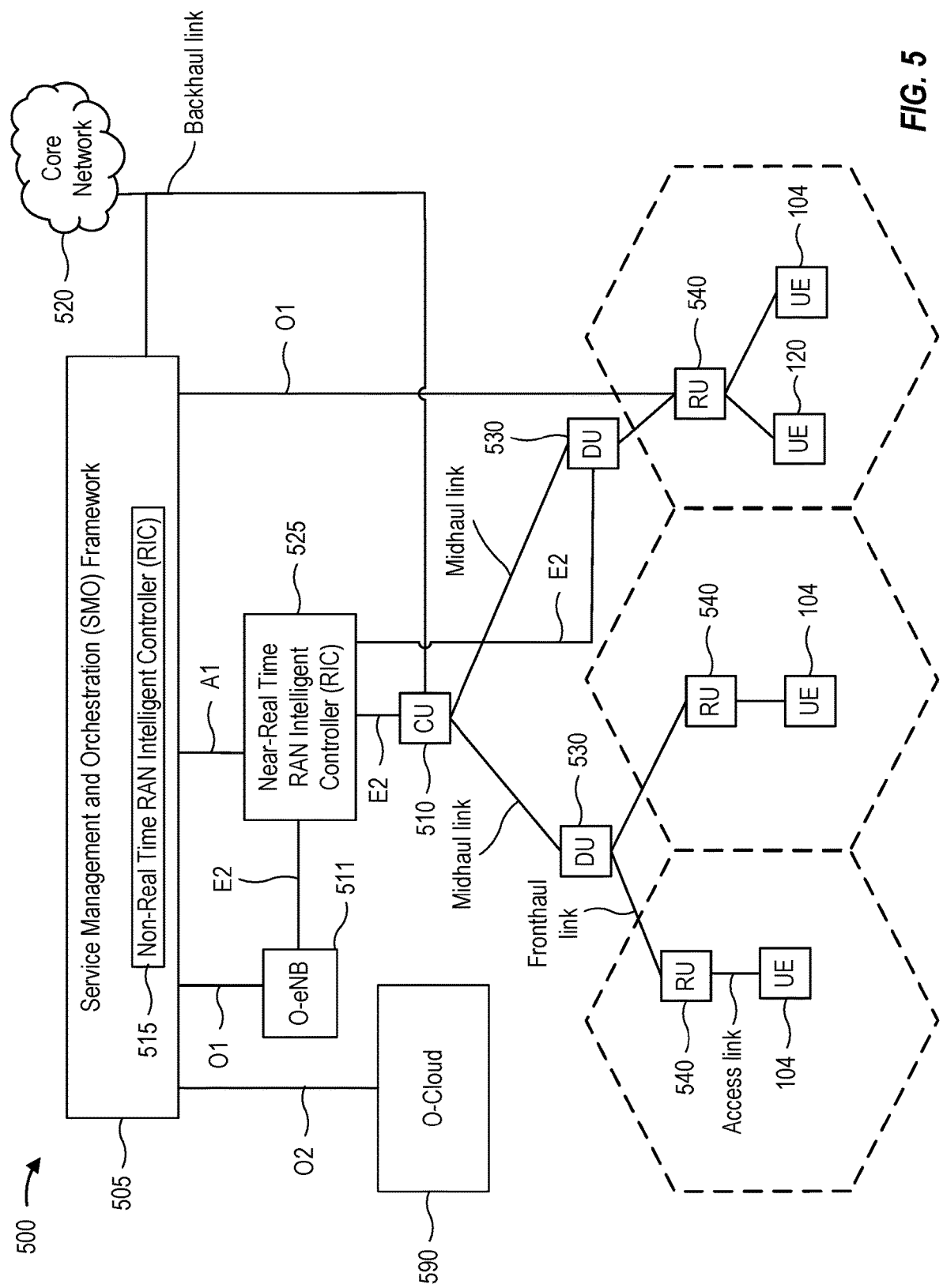
FIG. 5 is a block diagram conceptually illustrating an example disaggregated wireless communication network.

FIG. 5 depicts an example disaggregated base station 500 architecture. The disaggregated base station 500 architecture may include one or more central units (CUs) 510 that can communicate directly with a core network 520 via a backhaul link, or indirectly with the core network 520 through one or more disaggregated base station units (such as a Near-Real Time (Near-RT) RAN Intelligent Controller (RIC) 525 via an E2 link, or a Non-Real Time (Non-RT) RIC 515 associated with a Service Management and Orchestration (SMO) Framework 505, or both). A CU 510 may communicate with one or more distributed units (DUs) 530 via respective midhaul links, such as an F1 interface. The DUs 530 may communicate with one or more radio units (RUs) 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the Near-RT RICs 525, the Non-RT RICs 515 and the SMO Framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., Central Unit—User Plane (CU-UP)), control plane functionality (i.e., Central Unit—Control Plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements which may be managed via an operations and maintenance interface (such as an O1 interface). For virtualized network elements, the SMO Framework 505 may be configured to interact with a cloud computing platform (such as an open cloud (O-Cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via O1) or via creation of RAN management policies (such as A1 policies).

Example Multi-SIM Operation

Figure 6:
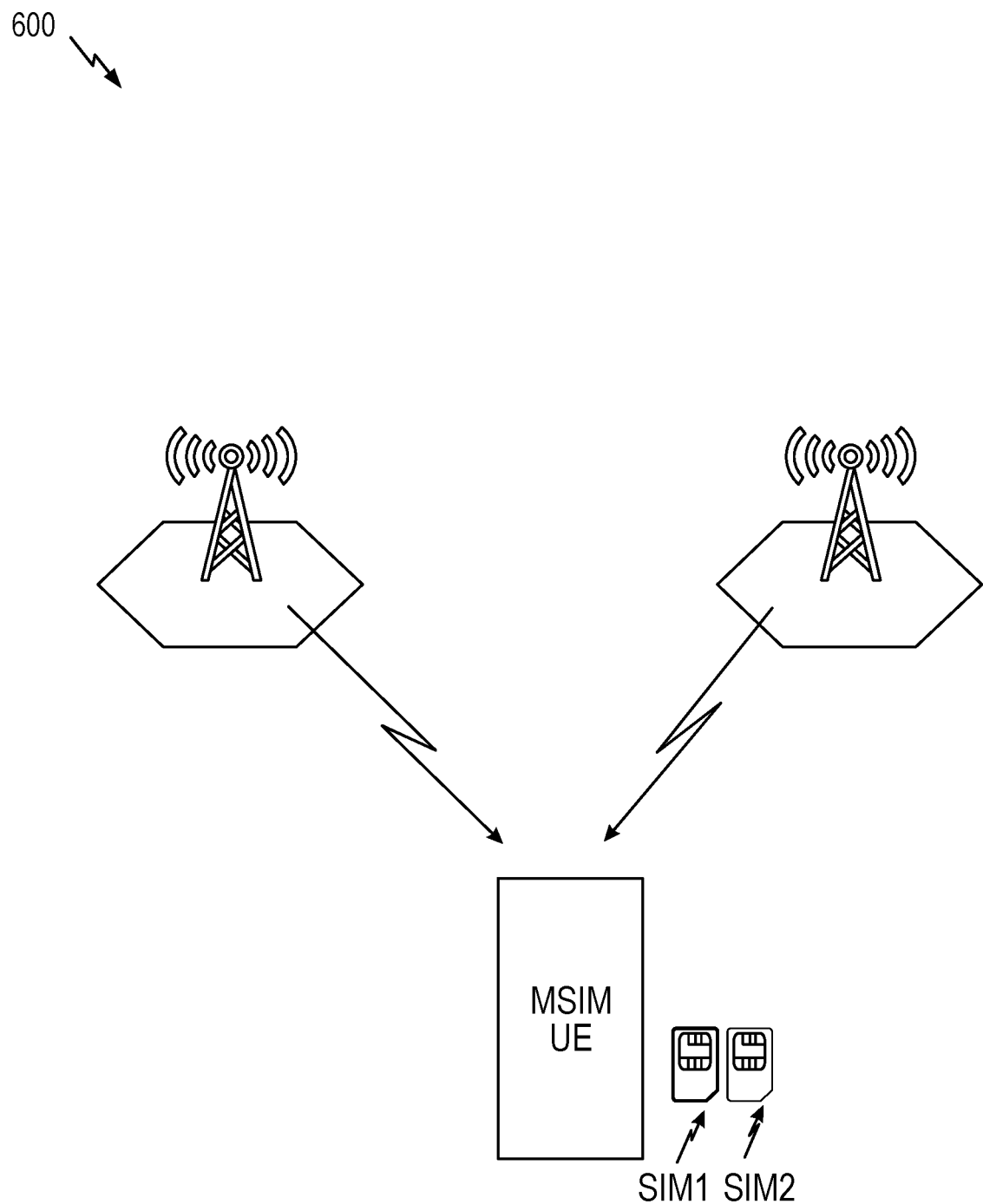
FIG. 6 illustrates an example multi-SIM deployment, in which a UE supports multiple subscriber identity modules (SIMs).

FIG. 6 illustrates an example multi-SIM deployment, in which a UE supports multiple SIMs (SIM1 and SIM2), which may support the same or different radio access technologies (RATs). At any given time, the multiple SIMs may concurrently be in an idle state and may support different modes of operation. For example, a UE with a single receiver may support a Single Receive Dual SIM Dual Standby (SR-DSDS) mode, where only one RAT is receiving at a time. In a Dual Receive (DR)-DSDS mode, the multi-SIM UE may simultaneously receive using multiple RATs at a given time.

NR concurrent radio-access technology (RAT) operation generally refers to operating multiple simultaneous active connections with at least one connection being on NR. For example, the two connections may involve LTE and NR connections, or both NR connections. Multi-SIM devices are able to connect to multiple networks independently without network awareness. Different UE behaviors may occur based on different implementations such as, for example, dual-SIM dual standby (DSDS).

DSDS generally refers to a dual-SIM deployment where the two SIM cards of the UE may be unable to simultaneously generate traffic. DSDS devices may be configured with two different network subscriptions (one for each SIM) only one of those subscriptions needs to support a data connection. Unlike voice services that have a specific phone number associated with each subscription, having data services on one subscription is often sufficient to provide all the data services needed by the user independent of the other subscription. With this configuration, a DSDS device may have one network subscription for both data and voice services and the other subscription intended for only providing voice communications. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMs to support a variety of different combination options. For example, dual-SIM (DSIM) devices could support the following:

SA-NR+SA-NR: both SIMs could support standalone (SA) NR (SA-NR);

NSA-NR+LTE: one SIM supports non-standalone (NSA) while another SIM supports LTE;

LTE+LTE: both SIMs support LTE;

LTE+W: one SIM supports LTE, the other supports wideband CDMA; or any other combination (X RAT+X RAT both SIMs the same RAT or X RAT+Y RAT the SIMs support different RATs).

In some cases, in a multi-SIM deployment, each SIM of the UE can belong to the same network carrier. For example, two or more SIMs (also referred to herein as subscribers or SUBs) belonging to the same operator can be in the following modes:
  (1) Idle+Idle: 2 or more SUBs in Idle camp to the same cell
  (2) Connected+Idle: 1 SUB in Idle and 1 Sub Connected camp to the same cell In conventional multi-SIM deployments, in scenarios where the UE is performing a low priority activity via a first SIM and a high priority activity is triggered on the same or different SIM of the UE, the high priority activity may be delayed, significantly impacting the performance of the UE. For example, assume an out of service indication is triggered on a SIM while another (or same) SIM is performing Closed Subscriber Group (CSG) autonomous search function. In this example, the recovery from the out of service may be delayed due to the CSG autonomous search, which may involve performing measurements for multiple CSG cells, performing a full band scan to obtain a given CSG cell, etc. These measurements and band scans may utilize RF resources of the UE, causing tune-aways and increasing the delay time for out of service recovery on the SIM in which the out of service indication is triggered on.

In some examples, in scenarios where a packet switch (PS) call/throughput is triggered on a SIM while another (or same) SIM is performing CSG autonomous search function, the triggered SIM may experience throughput degradation due to the CSG autonomous search function. In some examples, in scenarios where a SIM is not running throughput but the network sends measurement to the SIM for NR addition while another (or same) SIM is performing CSG autonomous search function, there may be a delay in NR measurements, additions/deletions/configurations, etc., in the triggered SIM, due to tune-aways triggered from the CSG autonomous search function. In some examples, in scenarios where a network is running a timer for a given NR configuration on a SIM and there is a delay on that configuration, the network may delete NR object(s) and deactivate NR from that SIM.

Aspects Related to Protecting Segmented PDUs

In current wireless systems (e.g., 5G new radio (NR)), the steady deployment of new features has increased radio resource control (RRC) over-the-air (OTA) message size. To accommodate increased OTA message sizes, segmentation features that allow a network entity (e.g., a gNB) to segment an RRC signaling message for piecemeal signaling may be implemented. RRC segmentation features may be applicable in both downlink (DL) and uplink (UL) transmission scenarios.

In NR, a DL RRC message may be segmented if an encoded RRC message has a protocol data unit (PDU) size exceeding a maximum packet data convergence protocol (PDCP) service data unit (SDU) size. Segmentation of the PDU may be performed at the RRC layer according to elements depicted in FIG. 7. In FIG. 7, RRC reconfiguration signaling 700 contains a segment for DL dedicated messaging (i.e., DLDedicatedMessageSegement), an indication that the RRC configuration is completed (i.e., RRCReconfigurationComplete), and an indication of the number of segments that comprise the segmented PDU (i.e., Nseg). After receiving the segments, a receiving user equipment (UE) may reassemble the segments to form a complete RRC message.

Figure 8:
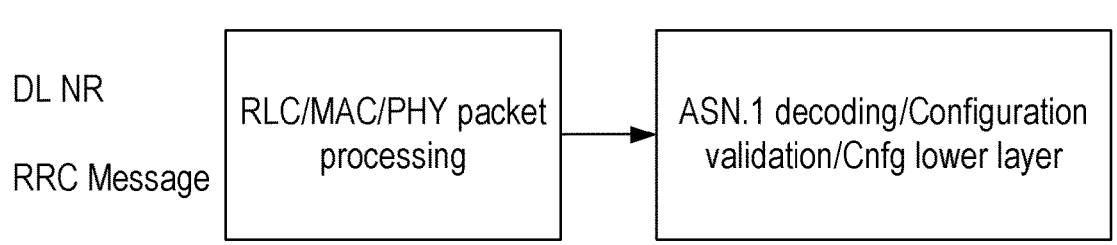
FIG. 8 is a diagram illustrating DL packet processing through a protocol stack.

FIG. 8 illustrates example operations 800 for processing DL PDU segments. When an RRC message is received, the PDU segments are processed at an RLC/MAC/PHY layer (e.g., RLC layer 415, MAC layer 420, PHY layer 425 of FIG. 4). After processing, the packets are decoded, validated, or configured at a lower layer (e.g., PDCP layer 410 of FIG. 4). In the current state of the art, a UE may have to wait until all DL PDU segments are received at the UE to start decoding the PDU segments. The processing time for each PDU segment may be defined (e.g., 16 ms is the processing time that may be required for a single PDU segment).

If the number of PDU segments are increased (e.g., from 5 to 10 PDU segments) as a result of an increased OTA message, the processing time for the PDU segments will also increase. A UE will not be able to process the PDU segments and send the complete PDU to the PDCP (e.g., PDCP 410 of FIG. 4) until all of the PDU segments have been received, which may take up the total processing time summed for each transmitted segment (e.g., 160 ms for 10 PDU segments). As a result, PDU segmentation may delay processing time for an extended RRC message. In some cases, where there is a high block error ratio (BLER) or noisy band radio conditions, the processing time may be delayed further.

According to certain aspects of the present disclosure, a UE may take action to improve and optimize UE behavior for processing RRC DL PDU segments in order to overcome processing delays caused by segmentation.

According to certain aspects of the present disclosure, a multiple SIM (MSIM) UE may protect PDU segments by continuing to process the set of PDU segments on a first SIM, even where a second SIM has higher priority. For example, a UE may reconfigure the priority of the first SIM to be higher than the priority of the second SIM.

In one case, a UE may protect PDUs during tune-aways. Currently, there is no protection for segmented PDUs if a UE is in a multiple subscriber identity module (MSIM) mode (e.g., dual-SIM dual-standby (DSDS) mode). A tune-away may be created when a second SIM begins a high-priority activity while a first SIM receives one or more PDU segments without decoding already received PDUs segments. The second subscription may interrupt the first subscription, and the unprocessed PDU segments may be discarded and may require retransmission. For example, during a 160 ms PDU segment processing period, if the second subscription performs an activity with a higher priority than PDU processing on the first subscription, the second subscription may interrupt the first subscription and the PDU segments received by the first subscription may be discarded. High priority activity may include voice call signaling, quality of service (QOS) signaling, ACCESS signaling, "busy traffic" priority, Acquisition, Channel Maintenance, IRAT Measurement.

Typically, when there is an active subscription without any higher layer activity (e.g., non-access stratum activity, message marketing cloud platform activity), the subscription acquires a "lock" that allows the active subscription to generate traffic in a DSDS scenario with background traffic. Any high priority activity on the idle subscription may interrupt the decoding of the subsequent segmented PDUs at RRC by acquiring the lock through its priority, causing the active subscription to go idle.

According to certain aspects of the present disclosure, to protect the continued PDU processing on the first subscription, a UE may reconfigure the priority of the subscription processing PDU segments from that of regular traffic to that of whatever priority is greater than the priority of the activity taking place on the second subscription. For example, when a UE is processing PDU segments on a first SIM having lower priority (e.g., background traffic priority), and a second SIM receives signaling that grants the second SIM higher priority (e.g., voice call signaling), the UE may continue to process the PDU segments on the first SIM. A UE may continue to process PDU segments, for example, when the priority of the first SIM is bumped from background traffic priority to ACCESS priority.

When the UE receives RRC signaling indicating segmented PDUs, the UE may grant high priority (e.g., ACCESS priority) to the subscription processing the PDU segments for the duration of the PDU processing period (e.g., 16 ms per PDU segment. 160 ms for 10 PDU segments). Within the PDU processing period and until the end of PDU processing, the priority of the second subscription may not impact the PDU segment activity on the first subscription. As a result, the UE may decode all the PDU segments during the 160 ms time because the second subscription cannot not acquire the lock, and the first subscription may remain active.

According to certain aspects of the present disclosure, a UE may protect PDU segments by, upon receiving segmented PDUs from a network entity, processing one or more of the PDU segments prior to receiving every PDU segment so that the UE may act on the information contained in the received PDU segment. In some cases, information in one of a set of PDU segments of a PDU may be information contained in all PDU segments of the PDU. Thus, early decoding may allow a US to process PDU segments more quickly, using information already received to act on instructions contained in the PDU segments without having to decode each segment of the PDU.

In one case, a UE may protect PDU segments by initiating an early decode of PDUs and acting on partial PDU segments. According to certain aspects of the present disclosure, a network may start transmitting PDUs and upon receipt, a UE may start decoding PDU segments incrementally.

In the current state of the art, a UE may not decode any segmented PDU packets until all packets are received. According to certain aspects, a UE may instead begin decoding DL packets immediately when they are received. As the UE decodes one or more of the received PDU segments, the UE may perform any activity directed by the decoded PDU segments. The UE may use information contained in the incrementally decoded packets, which may carry handover (HO), conditional HO, dual connectivity, and/or any measurement information. By implementing an early decoding procedure, a UE may start preparing radio frequency (RF) script building, early measurement, condition HO evaluation, and so on. This may benefit the UE when it is in a cell edge condition or if there is dip in reference signal received power (RSRP). By early decoding packets, the UE can prepare for HO if any of the packet carries HO information. Additionally, after radio link failure, a UE may utilize the partial decoded PDU segments for quicker service acquisition based on the partial decode.

For example, if only five PDU segments of ten PDU segments have been sent by the network, the UE may be able to decode the five PDU segments, partially start processing the decoded information prior to the end of the 160 ms PDU processing periodicity, and begin preparing responsive action.

In another case, a UE may process segmented, unordered DL PDU segments and may send the segments to the PDCP layer prior to the receipt of all packets of the PDU.

During transmission, PDU segments may be lost or received by the UE out of order. In the current state of the art, when an incomplete and/or unordered set of PDU segments are received at the UE, the UE will wait for all transmitting PDU segments to be received prior to sending the complete PDU to the PDCP layer. In some cases, when a UE receives a one or more unordered PDU segments, the UE may wait for an acknowledgement (ACK) from the network. Without an ACK, the UE may not proceed with processing the PDU segments. Because the UE may be unable to decode PDU segments until receipt and acknowledgement from a network entity, the UE may experience increased processing delay. The UE may experience further processing delay if the UE does not receive a complete PDU. When a complete PDU cannot be constructed from PDU segments and sent to the PDCP for decoding, received PDU segments may be discarded because a PCDP may only process complete PDUs.

According to certain aspects, to the network may trigger partial decode of the PDU segments at the UE when not all PDU segments have been received. UE sends the PDU segments to the PDCP layer, the UE may begin a partial decode at the RRC to use the reconfiguration message contents (like those illustrated in FIG. 6) to trigger early optimizations like preparing RF script building, early measurement, evaluating condition hand over, bringing up of millimeter wave (mmW) hardware, and so on.

In one example, where four PDU segments are sent by the network, the UE may be able to decode the first PDU segment, but may not be able to decode the second PDU segment before the third and fourth PDU segments are sent by the network. Instead of waiting until all PDU segments are received, a UE may continue decoding each of the PDU segments without sending an ACK for each PDU segment, even when certain PDU segments (e.g., the second PDU segment) cannot decoded. If the second PDU segment is discarded, the first, third, and fourth PDU segments may still be decoded. Thus, when the second PDU segment is retransmitted, the UE will have decoded and processed the first, third, and fourth PDU segments.

In another case, a UE may utilize layer two (L2) aggressive ACK and request for retransmission procedures. In the current state of the art, a UE waits for a network to send a poll request asking the UE for an ACK before transmitting an ACK. This may cause delay where any PDU segments sent by the network are unable to be decoded until a UE sends a NACK in response to a polling request. According to certain aspects, a UE may use the procedure for requesting retransmission earlier than the normal wait procedure, without waiting for polling from network. Additionally, a UE may send an ACK for each segment of a segmented PDU instead of waiting for poll retransmission.

Example Wireless Methods

Figure 9:
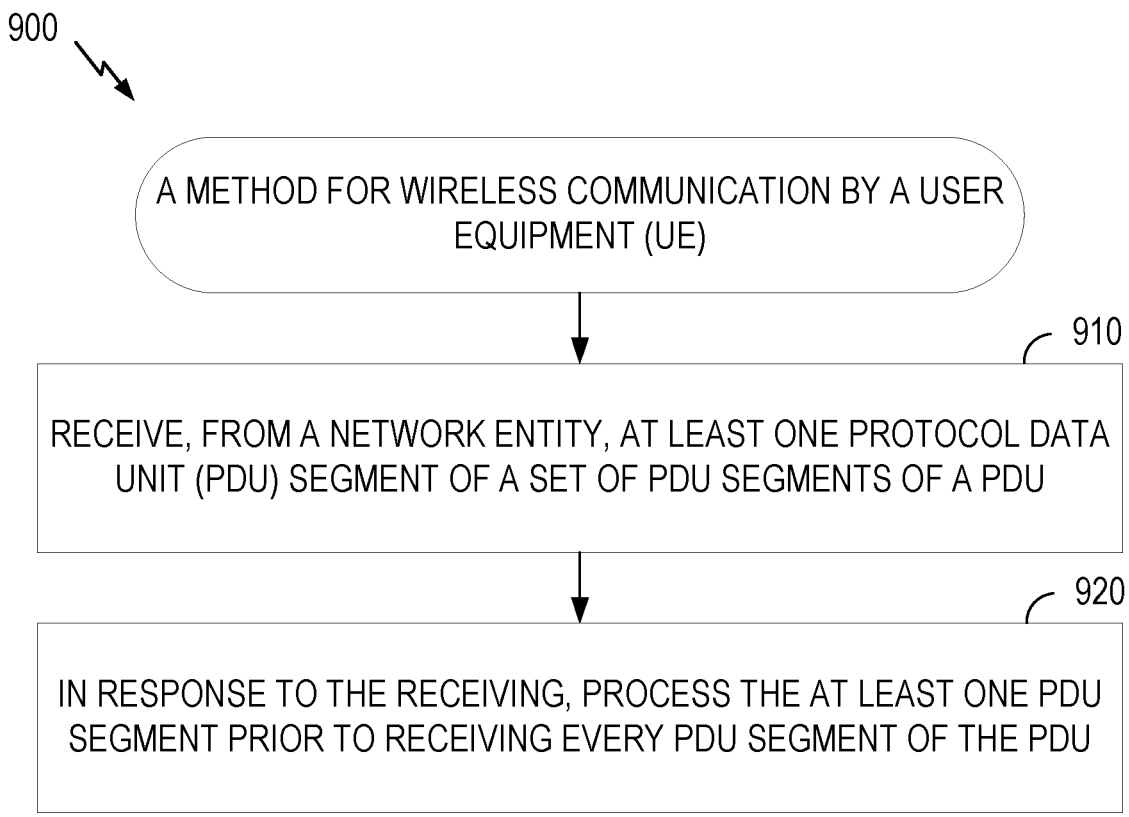
FIG. 9 illustrates example operations for wireless communications by a first UE, in accordance with certain aspects of the present disclosure.

FIG. 9 illustrates example operations 900 for wireless communications by a UE, in accordance with certain aspects of the present disclosure. For example, operations 900 may be performed by a user equipment (UE) 104 of FIG. 1 for protecting segmented protocol data units (PDUs) received during downlink (DL) transmission Operations 900 begin at 910, when a UE receives, from a network entity, at least one protocol data unit (PDU) segment of a set of PDU segments of a PDU. A PDU may be segmented when the radio resource control (RRC) message of the PDU exceeds a maximum packet data convergence protocol (PDCP) service data unit (SDU) size. PDU segments may be transmitted to a UE via RRC signaling and sent to a PDCP for processing.

At 920, a UE, in response to the receiving, processes the at least one PDU segment prior to receiving every PDU segment of the PDU. For example, certain information in one PDU segment may be common to each PDU segment. To facilitate faster processing, a UE may decode only a portion of a PDU in form of a PDU segment and act on the information contained in the segment. In some cases, the information may contain handover procedure information, which may allow a UE to complete a handover process where Reference Signal Received Power (RSRP) is low.

Figure 10:
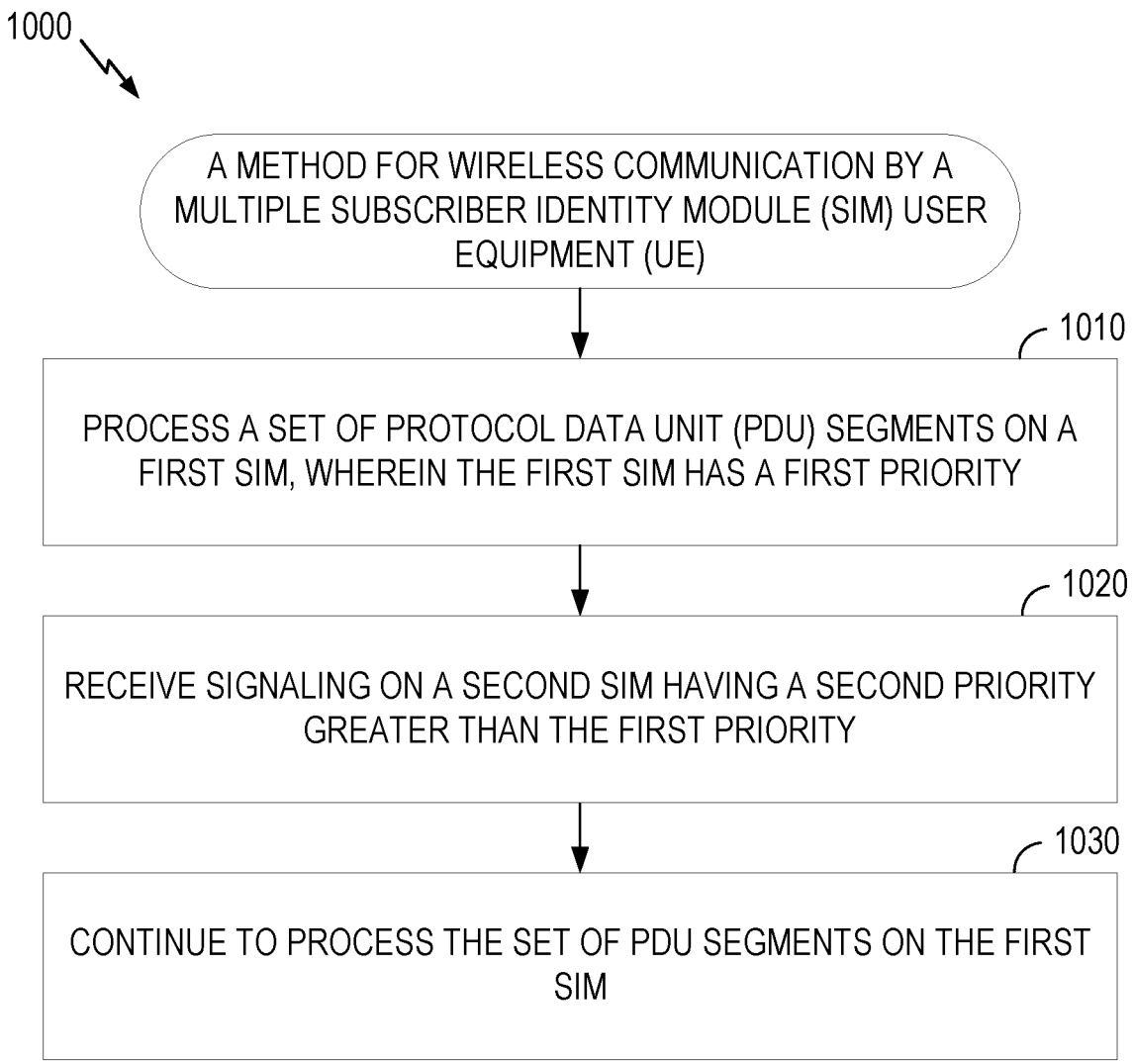
FIG. 10 illustrates example operations for wireless communications by a first multiple subscriber identity module (MSIM) UE, in accordance with certain aspects of the present disclosure.

FIG. 10 illustrates example operations 1000 for wireless communications by a UE, in accordance with certain aspects of the present disclosure. For example, operations 1000 may be performed by a user equipment (UE) 104 of FIG. 1 for protecting segmented protocol data units (PDUs) received during downlink (DL) transmission.

Operations 1000 begin at 1010, when a UE processes a set of protocol data unit (PDU) segments on a first SIM, wherein the first SIM has a first priority. For example, a first SIM may initially have a priority corresponding to background traffic priority when processing PDU segments. While the first may be active, having acquired the lock that allows it to send and received signaling while the second SIM remains idle, the priority of the SIM remains low and the lock may be acquired by a SIM having higher priority.

At 1020, a UE receives signaling on a second SIM having a second priority greater than the first priority. For example, if a second SIM receives a voice call, the voice call will grant the second SIM a higher priority than a first SIM having priority corresponding to background traffic.

At 1030, a UE continuing to process the set of PDU segments on the first SIM. For example, a UE may continue to process the PDU segments by keeping the lock despite the high second SIM priority. A UE may accomplish this, for example, by reconfiguring the first priority to be greater than the second priority. For instance, a first SIM having ACCESS priority will overcome the priority associated with a voice call.

Example Wireless Communication Devices

Figure 11:
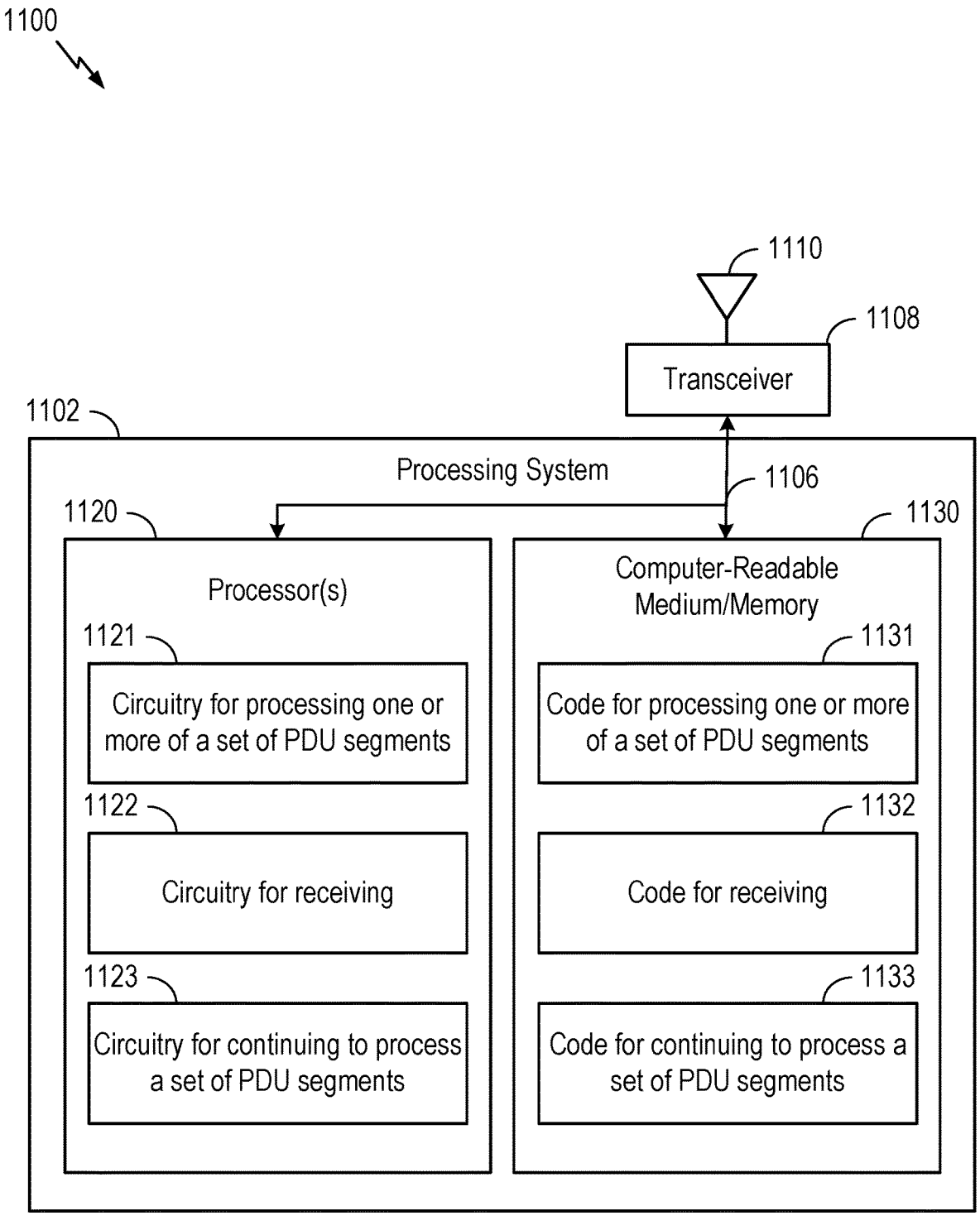
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 9-10. In some examples, communication device 1100 may be a user equipment 104 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 9-10, or other operations for performing the various techniques discussed herein for recieve and process segmented PDUs.

In the depicted example, computer-readable medium/memory 1130 stores code 1131 for processing one or more of a set of PDU segments, code 1132 for receiving, and code 1133 for continuing to process a set of PDU segments.

In the depicted example, the one or more processors 1120 include circuitry configured to implement the code stored in the computer-readable medium/memory 1130, including circuitry 1121 for processing one or more of a set of PDU segments, circuitry 1122 for receiving, and circuitry 1123 for continuing to process a set of PDU segments.

Various components of communications device 1100 may provide means for performing the methods described herein, including with respect to FIGS. 9-10.

In some examples, means for transmitting or sending (or means for outputting for transmission) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving (or means for obtaining) may include the transceivers 254 and/or antenna(s) 252 of the user equipment 104 illustrated in FIG. 2 and/or transceiver 1108 and antenna 1110 of the communication device 1100 in FIG. 11.

In some examples, means for processing, receiving, and/or continuing may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including PDU component 281).

Notably, FIG. 11 is an example, and many other examples and configurations of communication device 1100 are possible.

Example Clauses

Implementation examples are described in the following numbered clauses:

Clause 1: A method for wireless communication by a user equipment (UE), comprising receiving, from a network entity, at least one protocol data unit (PDU) segment of a set of PDU segments of a PDU, and in response to the receiving, processing the at least one PDU segment prior to receiving every PDU segment of the PDU.

Clause 2: The method of clause 1, wherein the receiving comprises receiving the at least one PDU segment of the set of PDU segments via radio resource control (RRC) signaling.

Clause 3: The method of any one of clauses 1 and 2, wherein the processing comprises processing every received PDU segment of the set of PDU segments in a 16 ms time period.

Clause 4: The method of any one of clauses 1-3, wherein the processing comprises decoding the at least one PDU segment of the set of PDU segments of the PDU.

Clause 5: The method of any one of clauses 1 and 4, further comprising: based, at least in part, on the decoding, taking one or more actions responsive to information indicated in the at least one PDU segment.

Clause 6: The method of clause 5, wherein taking the one or more actions comprises performing at least one of: handover operations, conditional handover operations, dual connectivity operations, measurement operations, radio frequency (RF) script building, or millimeter wave (mmW) operations.

Clause 7: The method of any one of clauses 4-6, wherein the decoding comprises decoding at a radio resource control (RRC) layer.

Clause 8: The method of any one of clauses 4-7, wherein: the receiving comprises receiving at least one PDU segment of the set of PDU segments out of order, and wherein the processing comprises decoding the received PDU segments regardless of order.

Clause 9: The method of clause 8, further comprising: based, at least in part, on the decoding, taking one or more actions responsive to information indicated in the received PDU segments.

Clause 10: The method of clause 9, wherein taking the one or more actions comprises performing at least one of: handover operations, conditional handover operations, dual connectivity operations, measurement operations, radio frequency (RF) script building, and millimeter wave (mmW) operations.

Clause 11: The method of any one of clauses 8-10, wherein decoding comprises decoding at a radio resource control (RRC) layer.

Clause 12: The method of any one of clauses 1-11, further comprising in response to the receiving, transmitting a retransmission request for any PDU segments of the PDU.

Clause 13: The method of clause 12, wherein transmitting the retransmission request is according to layer two (L2) aggressive request for retransmission procedures.

Clause 14: The method of clauses 1-13, further comprising transmitting an separate acknowledgement (ACK) for each received PDU segment of the PDU.

Clause 15: The method of clause 14, wherein transmitting a retransmission request is according to layer two (L2) aggressive ACK procedures.

Clause 16: A method for wireless communication by a multiple subscriber identity module (SIM) user equipment (UE), comprising processing a set of protocol data unit (PDU) segments on a first SIM, wherein the first SIM has a first priority, receiving signaling on a second SIM having a second priority greater than the first priority, and continuing to process the set of PDU segments on the first SIM.

Clause 17: The method of clause 16, wherein the set of PDU segments is received via radio resource control (RRC) signaling.

Clause 18: The method of any one of clauses 16 and 17, wherein the processing comprises processing every received PDU segment of the set of PDU segments in a 16 ms time period.

Clause 19: The method of any one of clauses 16 and 18, wherein continuing to process the set of PDU segments comprises reconfiguring the first priority to be greater than the second priority.

Clause 20: The method of clause 19, wherein reconfiguring the first priority to be greater than a voice call priority, or reconfiguring the first priority to be greater than a quality-of-service (QOS) call priority.

Clause 21: The method of any one of clauses 19 and 20, where reconfiguring the first priority to be greater than the second priority comprises reconfiguring the first priority to be ACCESS priority.

Clause 22: The method of any one of clauses 16-21, wherein the first SIM is in an active mode and the second SIM is in an idle mode.

Clause 23: An apparatus, comprising: a memory comprising executable instructions; one or more processors configured to execute the executable instructions and cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by one or more processors of an apparatus, cause the apparatus to perform a method in accordance with any one of Clauses 1-22.

Clause 26: A computer program product embodied on a computer-readable storage medium comprising code for performing a method in accordance with any one of Clauses 1-22.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (u) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to 2⁴×15 kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of protecting segmented protocol data units (PDUs) received during downlink (DL) transmission communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), the method comprising:
receiving on a first subscriber identity module (SIM) of the UE, from a network entity, at least one protocol data unit (PDU) segment of a set of PDU segments of a PDU;
in response to the receiving, processing the at least one PDU segment;
receiving signaling on a second SIM having a second priority greater than a first priority of the first SIM; and
continuing to process the set of PDU segments on the first SIM by reconfiguring the first priority of the first SIM of the UE to a greater priority than the second priority of the second SIM of the UE.

2. The method of claim 1, wherein the receiving comprises receiving the at least one PDU segment of the set of PDU segments of the PDU via radio resource control (RRC) signaling.

3. The method of claim 1, wherein the processing comprises processing each PDU segment of the set of PDU segments in a 16 ms time period.

4. The method of claim 3, further comprising based, at least in part, on the processing, taking one or more actions responsive to information indicated in the at least one PDU segment prior to receiving every PDU segment of the set of PDU segments of the PDU.

5. The method of claim 4, wherein the taking the one or more actions comprises performing at least one of: handover operations, conditional handover operations, dual connectivity operations, measurement operations, radio frequency (RF) script building, or millimeter wave (mmW) operations responsive to the information indicated in the at least one PDU segment.

6. The method of claim 1, further comprising attempting to decode the set of PDU segments at a radio resource control (RRC) layer.

7. The method of claim 1, wherein the receiving comprises receiving the at least one PDU segment of the set of PDU segments out of order.

8. The method of claim 1, further comprising transmitting a retransmission request for one or more PDU segments of the set of PDU segments of the PDU.

9. The method of claim 8, wherein transmitting the retransmission request is according to layer two (L2) aggressive request for retransmission procedures, and wherein the transmitting the retransmission request is without waiting for polling from a network entity.

10. The method of claim 1, further comprising transmitting an acknowledgement (ACK) for the at least one PDU segment.

11. The method of claim 10, wherein transmitting the ACK is according to layer two (L2) aggressive ACK procedures, wherein the transmitting the ACK is without waiting for polling from a network entity.

12. The method of claim 1, further comprising:
receiving signaling on the second SIM; and
continuing to receive the set of PDU segments on the first SIM.

13. The method of claim 1, wherein the reconfiguring the first priority comprises increasing the first priority to a priority higher than a voice call priority, a quality-of-service (QOS) call priority, or a combination thereof.

14. The method of claim 1, wherein the reconfiguring the first priority comprises reconfiguring the first priority to be ACCESS priority.

15. The method of claim 1, further comprising, in response to the receiving, attempting to decode each received PDU segment upon receipt of the PDU segment without waiting to receive another PDU segment.

16. A user equipment (UE) configured for wireless communications, the UE comprising:
a memory comprising computer-executable instructions; and
one or more processors configured to, individually or collectively, execute the computer-executable instructions and cause the UE to:
receive on a first subscriber identity module (SIM) of the UE, from a network entity, at least one protocol data unit (PDU) segment of a set of PDU segments of a PDU;
in response to the receipt of the at least one PDU segment, process the at least one PDU segment;
receive signaling on a second SIM having a second priority greater than a first priority of the first SIM; and
continue to process the set of PDU segments on the first SIM by reconfiguring the first priority of the first SIM of the UE to a greater priority than the second priority of the second SIM of the UE prior to receiving every PDU segment of the set of PDU segments of the PDU.

17. The UE of claim 16, wherein the one or more processors are configured to, individually or collectively, execute the computer-executable instructions and cause the UE to receive the at least one PDU segment of the set of PDU segments of the PDU via radio resource control (RRC) signaling.

18. The UE of claim 16, wherein the one or more processors are configured to, individually or collectively, execute the computer-executable instructions and cause the UE to attempt to decode each PDU segments of the set of PDU segments in a 16 ms time period.

19. The UE of claim 16, wherein the one or more processors are further configured to, individually or collectively, execute the computer-executable instructions and cause the UE to take one or more actions responsive to information indicated in at least one PDU segment of the set of PDU segments prior to receiving every PDU segment of the set of PDU segments of the PDU.

20. The UE of claim 19, wherein the taking the one or more actions comprises performing at least one of: handover operations, conditional handover operations, dual connectivity operations, measurement operations, radio frequency (RF) script building, or millimeter wave (mmW) operations responsive to the information indicated in the at least one PDU segment.

21. The UE of claim 16, wherein the one or more processors are configured to, individually or collectively, execute the computer-executable instructions and cause the UE to attempt to decode the set of PDU segments at a radio resource control (RRC) layer.

22. The UE of claim 16, wherein at least one PDU segment of the set of PDU segments is received out of order.

23. The UE of claim 16, wherein the one or more processors are further configured to, individually or collectively, execute the computer-executable instructions and cause the UE to transmit a retransmission request for one or more PDU segments of the set of PDU segments of the PDU.

24. The UE of claim 23, wherein the one or more processors are configured to, individually or collectively, execute the computer-executable instructions and cause the UE to transmit the retransmission request according to layer two (L2) aggressive request for retransmission procedures, without waiting for polling from a network entity.

25. The UE of claim 16, wherein the one or more processors are further configured to, individually or collectively, execute the computer-executable instructions and cause the UE to transmit an acknowledgement (ACK) for at least one PDU segment of the set of PDU segments.

26. The UE of claim 25, wherein the one or more processors are configured to, individually or collectively, execute the computer-executable instructions and cause the UE to transmit the ACK is according to layer two (L2) aggressive ACK procedures, without waiting for polling from a network entity.

27. The UE of claim 16, wherein the one or more processors are configured to, individually or collectively, execute the computer-executable instructions and cause the UE to, in response to the receiving, attempt to decode each received PDU segment upon receipt of the PDU segment without waiting to receive another PDU segment.

28. A non-transitory computer-readable medium storing computer-executable code for wireless communication by a user equipment (UE), the computer-executable code comprising:
    code for receiving on a first subscriber identity module (SIM) of the UE, from a network entity, at least one protocol data unit (PDU) segment of a set of PDU segments of a PDU;
    code for, in response to the receiving, processing the at least one PDU segment;
    code for receiving signaling on a second SIM having a second priority greater than a first priority of the first SIM; and
    code for continuing to process the set of PDU segments on the first SIM by reconfiguring the first priority of the first SIM of the UE to a greater priority than the second priority of the second SIM of the UE.

29. The non-transitory computer-readable medium of claim 28, the computer-executable code further comprising code for, in response to the receiving, attempting to decode each received PDU segment upon receipt of the PDU segment without waiting to receive another PDU segment.

30. An apparatus comprising:
    means for receiving on a first subscriber identity module (SIM) of the apparatus, from a network entity, at least one protocol data unit (PDU) segment of a set of PDU segments of a PDU;
    means for, in response to the receiving, processing the at least one PDU segment;
    means for receiving signaling on a second SIM having a second priority greater than a first priority of the first SIM; and
    means for continuing to process the set of PDU segments on the first SIM by reconfiguring the first priority of the first SIM of the apparatus to a greater priority than the second priority of the second SIM of the apparatus.

31. The apparatus of claim 30, further comprising means for, in response to the receiving, attempting to decode each received PDU segment upon receipt of the PDU segment without waiting to receive another PDU segment.

* * * * *